(12) United States Patent
Hall et al.

(10) Patent No.: US 12,327,576 B1
(45) Date of Patent: Jun. 10, 2025

(54) ADJUSTABLE SUB-REGIONS FOR SHINGLED MAGNETIC RECORDING

(71) Applicant: Western Digital Technologies, Inc., San Jose, CA (US)

(72) Inventors: David Hall, Rochester, MN (US); Shad Thorstenson, Rochester, MN (US); Andrew Larson, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/435,966

(22) Filed: Feb. 7, 2024

(51) Int. Cl.
- *G11B 20/12* (2006.01)
- *G11B 5/012* (2006.01)
- *G11B 5/09* (2006.01)
- *G11B 5/596* (2006.01)

(52) U.S. Cl.
CPC ............... *G11B 5/012* (2013.01); *G11B 5/09* (2013.01); *G11B 5/59627* (2013.01); *G11B 20/1217* (2013.01); *G11B 2020/1238* (2013.01); *G11B 2020/1292* (2013.01)

(58) Field of Classification Search
CPC ... G11B 5/09; G11B 20/12; G11B 2020/1238; G11B 2020/1247; G11B 5/54; G11B 5/58; G11B 20/18; G11B 20/1205; G11B 20/1209
USPC .......................................................... 360/48
See application file for complete search history.

(56) References Cited

U.S. PATENT DOCUMENTS

| | | | |
|---|---|---|---|
| 8,832,409 B2 * | 9/2014 | Feldman | G11B 20/1258 |
| | | | 711/173 |
| 8,908,310 B1 | 12/2014 | Bai et al. | |
| 9,153,290 B1 | 10/2015 | Bandic et al. | |
| 9,281,008 B1 | 3/2016 | Harllee, III et al. | |
| 9,383,923 B1 | 7/2016 | Malina et al. | |
| 10,381,040 B1 | 8/2019 | Boyle et al. | |

(Continued)

FOREIGN PATENT DOCUMENTS

WO   2015039140 A1   3/2015

OTHER PUBLICATIONS

Hajkazemi et al., "μCache: A Mutable Cache for SMR Translation Layer"; Nov. 2020; IEEE MASCOTS 2020 Symposium on Modeling, Analysis, and Simulation of Computer and Telecommunication Systems.

(Continued)

*Primary Examiner* — Nabil Z Hindi

(74) *Attorney, Agent, or Firm* — Barry IP Law, P.C.

(57) ABSTRACT

Data is written in tracks in a first sub-region of a region of a disk using Shingled Magnetic Recording (SMR). It is determined whether a predetermined data storage capacity for the region can be reached by adding a sub-region guard band and shingle writing throughout a remaining portion of the region using a lower limit of track overlap. The sub-region guard band does not store data and separates the first sub-region from a second sub-region in the region. In response to determining that the predetermined data storage capacity for the region can be reached by adding the sub-region guard band and shingle writing with the lower limit of track overlap throughout the remaining portion of the region, the sub-region guard band is added, and the second sub-region is shingle written with at least as much track overlap as the lower limit of track overlap.

20 Claims, 7 Drawing Sheets

(56) References Cited

U.S. PATENT DOCUMENTS

2005/0185319 A1    8/2005   Liu et al.
2015/0179214 A1    6/2015   Pantel
2016/0299698 A1   10/2016  Hall

OTHER PUBLICATIONS

Kenji Aruga, "Off-Track Capability Simulation of Shingled Magnetic Recording Under Mechanical Track Misregistration"; Jun. 2013; IEEE Transactions on Magnetics, vol. 49, No. 6.

* cited by examiner

ADJUSTABLE SUB-REGIONS FOR SHINGLED MAGNETIC RECORDING

BACKGROUND

Data Storage Devices (DSDs) are often used to record data onto or to reproduce data from a storage media. One type of storage media includes a rotating magnetic disk, such as in a Hard Disk Drive (HDD). In such DSDs, a head is positioned in relation to a disk to magnetically read and write data in tracks on a surface of the disk.

The amount of data that can be stored on a disk in a given area (i.e., an areal density) generally continues to increase with each new generation of DSDs that use a disk to store data. In some cases, some or all of the tracks on a disk may be shingle written as overlapping tracks with Shingled Magnetic Recording (SMR) as a way of increasing the number of Tracks Per Inch (TPI) on the disk by making the tracks narrower. SMR increases TPI by using a relatively wide shingle write head with a stronger magnetic field to overlap tracks like roof shingles. The non-overlapping portion then serves as a narrow track that can be read by a narrower read head. However, the overlapping of tracks in an SMR zone means that previously shingle written data cannot usually be modified or rewritten without affecting an adjacent track.

To address this issue, the overlapping tracks are written in zones or regions that are separated by guard bands where no data is written to allow for the regions to be rewritten without affecting other regions of overlapping tracks on the disk. In some cases, the regions can be defined by a host to store 128 Mebibytes (MiB) or 256 MiB of data. A garbage collection process can be performed on a region by reading the valid data from the region and rewriting the valid data in a different region or in the same region to reclaim storage capacity being consumed by invalid or obsolete data in the garbage collected region. In addition, a data refresh process may also be performed in an SMR region to ensure the integrity of the stored data over time by reading data in a region and rewriting the data in the same or a different region. The garbage collection and data refresh processes add to the maintenance overhead for SMR by consuming time and processing resources to read and rewrite data from SMR regions.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Environments

Figure 1:
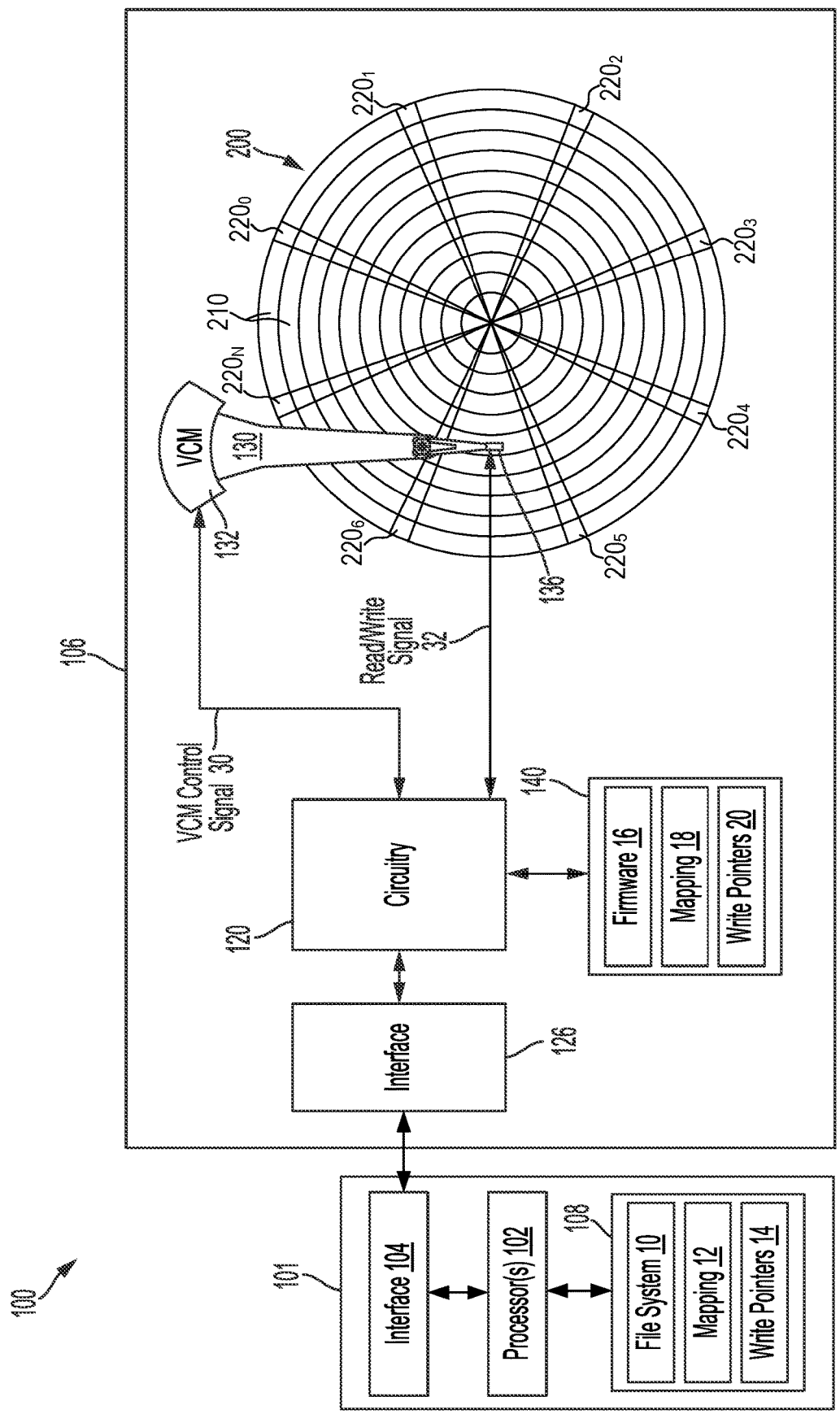
FIG. 1 is a block diagram of an example system including a Data Storage Device (DSD) and a host according to one or more embodiments.

FIG. 1 is a block diagram of an example system including Data Storage Device (DSD) 106 which communicates with host 101 according to one or more embodiments. In the example of FIG. 1, host 101 is separate from DSD 106, and may include, for example, a server or other computer system. In other implementations, host 101 may be housed together with DSD 106 as part of a single electronic device, such as, for example, a desktop, laptop or notebook computer, or another type of electronic device such as a tablet, smartphone, network media player, portable media player, or Digital Video Recorder (DVR).

As shown in the example of FIG. 1, DSD 106 includes Non-Volatile Memory (NVM) in the form of magnetic disk 200. In this regard, DSD 106 may be considered a Hard Disk Drive (HDD) since it includes a rotating magnetic disk. In other embodiments, DSD 106 can include other NVM media in addition to disk 200, such as flash memory or other non-volatile solid-state memory.

As will be appreciated by those of ordinary skill in the art with reference to the present disclosure, disk 200 may form part of a disk pack including multiple disks that are circumferentially aligned with disk 200. In such implementations, head 136 may form part of a Head Stack Assembly (HSA) including heads arranged to read data from and write data to a corresponding disk surface in the disk pack. In this regard, head 136 can move in conjunction with another head under disk 200 to read and write data on a bottom surface of disk 200, and/or head 136 can move in conjunction with other heads for additional disks.

As shown in FIG. 1, disk 200 includes concentric regions 210 that each include multiple concentric tracks for storing data. The data read from disk 200 by head 136 is provided to circuitry 120 via read/write signal 32 and the data written to disk 200 by head 136 is provided from circuitry 120 to head 136 via read/write signal 32. Those of ordinary skill in the art will appreciate that the number of regions 210 shown in FIG. 1 is for the purposes of illustration and that disk 200 may include, for example, less regions than shown in FIG. 1 or many more regions than shown in FIG. 1, such as thousands of regions or tens of thousands of regions.

Figure 2:
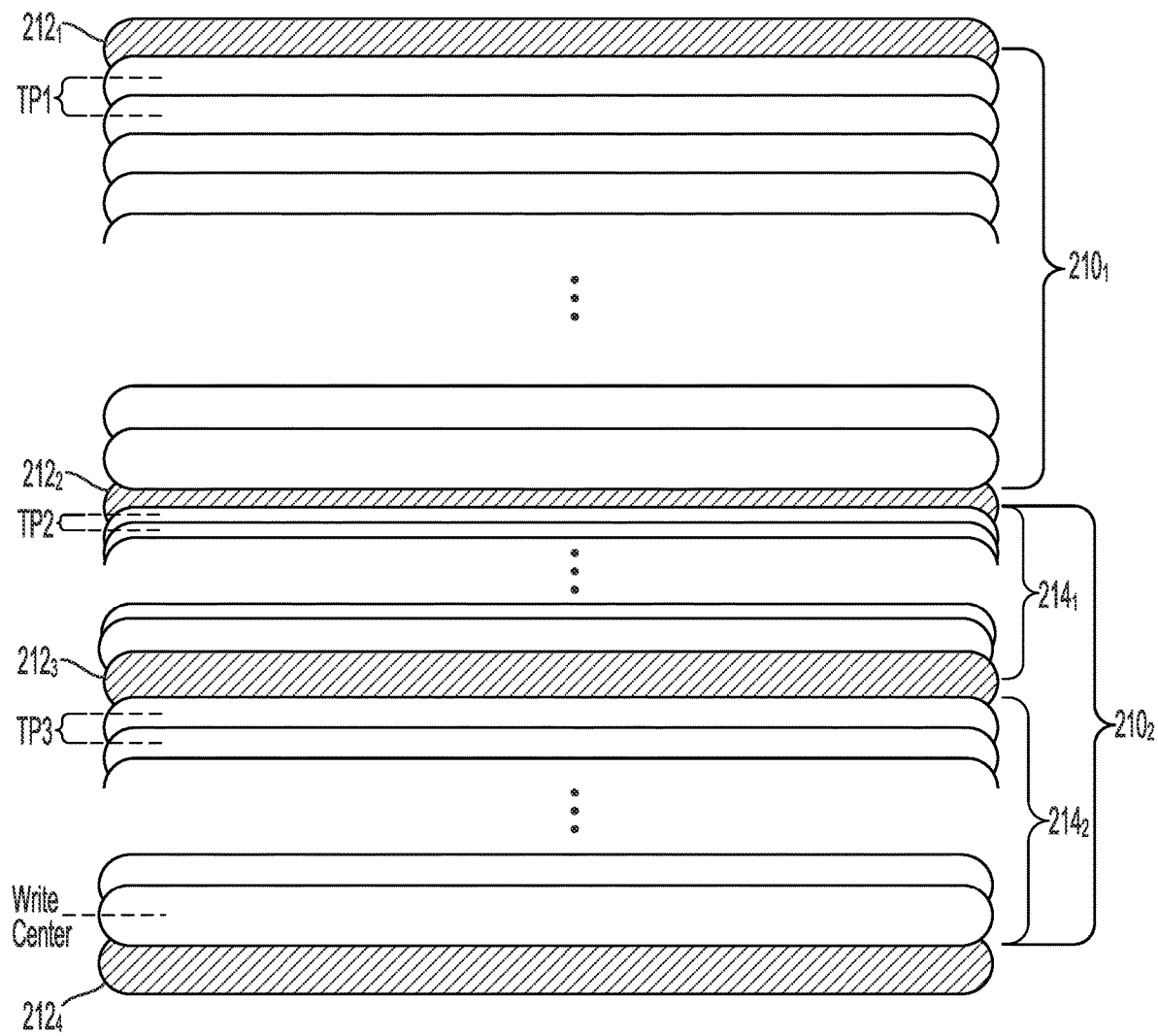
FIG. 2 is an example of two regions with one region including sub-regions according to one or more embodiments.

Disk 200 also includes a plurality of angularly spaced servo wedges $220_0$ to $220_N$, each of which may include embedded servo information that can be read from disk 200 by head 136 to determine the position of head 136 over disk 200. For example, each servo wedge 220 may include a pattern of alternating magnetic transitions (i.e., a servo burst), which may be read from disk 200 by head 136 and processed by circuitry 120 to estimate the position of head 136 on disk 200. The angular spacing between servo wedges 220 may be uniform, as shown in the example of FIG. 2. As appreciated by those of ordinary skill in the art, each track may include, for example, over 100 servo wedges for positioning head 136.

Disk 200 is rotated by a Spindle Motor (SM) and head 136 is positioned to read and write data on the surface of disk 200 using Voice Coil Motor (VCM) 132. In more detail, head 136 is connected to the distal end of actuator 130 which is rotated by VCM 132 to position head 136 over disk 200 to read or write data in annular tracks on disk 200. A servo system of circuitry 120 controls the position of head 136 using VCM control signal 30, which may include a control current.

In the example of FIG. 1, DSD 106 includes circuitry 120, which can include one or more processors for executing instructions, such as a microcontroller, a Digital Signal Processor (DSP), an Application-Specific Integrated Circuit (ASIC), a Field Programmable Gate Array (FPGA), hard-wired logic, analog circuitry and/or a combination thereof. In one implementation, circuitry 120 can include a System on a Chip (SoC), which may also include memory 140 or other local memory, and/or interface 126.

Interface 126 is configured to enable DSD 106 to communicate with host 101, and may use, for example, Serial Advanced Technology Attachment (SATA), Peripheral Component Interconnect express (PCIe), Compute Express Link (CXL), Small Computer System Interface (SCSI), Serial Attached SCSI (SAS), Ethernet, or WiFi, and/or one or more other standards. As will be appreciated by those of ordinary skill in the art, interface 126 can be included as part of circuitry 120. Although FIG. 1 depicts the co-location of host 101 and DSD 106, in other implementations, the two need not be physically co-located. In such implementations, DSD 106 may be located remotely from host 101 and connected to host 101 via a network interface. In such implementations, interface 126 can include a network interface card.

Memory 140 can include, for example, a Dynamic Random Access Memory (DRAM) or other type of solid-state memory, such as Static Random Access Memory (SRAM) or flash memory. While the description herein refers to solid-state memory generally, it is understood that solid-state memory may comprise one or more of various types of memory devices such as flash integrated circuits, Chalcogenide RAM (C-RAM), Phase Change Memory (PCM), Programmable Metallization Cell RAM (PMC-RAM), Ovonic Unified Memory (OUM), Resistive RAM (RRAM), NAND memory (e.g., Single-Level Cell (SLC) memory, Multi-Level Cell (MLC) memory, Triple-Level Cell (TLC) memory, or any combination thereof), NOR memory, EEPROM, Ferroelectric Memory (FeRAM), Magnetoresistive RAM (MRAM), 3D XPoint memory, other discrete NVM chips, or any combination thereof.

Data stored in memory 140 can include data read from disk 200, data to be stored on disk 200, instructions loaded from firmware 16 for execution by circuitry 120, and/or data used in executing firmware 16. In the example of FIG. 1, memory 140 also stores mapping 18 and write pointers 20. Mapping 18 can associate logical identifiers (e.g., Logical Block Addresses (LBAs)) with physical identifiers (e.g., Physical Block Addresses (PBAs)) corresponding to physical locations on disk 200 for accessing data. Mapping 18 in some implementations may indicate the locations of the different regions 210 on disk 200.

The regions 210 can provide a predetermined data storage capacity that may be defined by host 101, such as 128 Mebibytes (MiB) or 256 MiB of data, that is shingle written in overlapping tracks using Shingled Magnetic Recording (SMR). As noted above, the non-overlapping portions of the tracks serve as narrow tracks that can provide a higher data density on disk 200 in terms of Tracks Per Inch (TPI). However, the overlapping of tracks using SMR means that previously shingle written data cannot usually be modified or rewritten without affecting an adjacent track.

Regions 210 are therefore separated by guard bands where no data is written to allow for the regions to be rewritten without affecting other regions of overlapping tracks on disk 200 (e.g., guard bands 212 in FIG. 2). In some cases, a garbage collection process can be performed by host 101 or DSD 106 in a region 210 by reading the valid data from the region and rewriting the valid data in a different region or in the same region to reclaim storage capacity being consumed by invalid or obsolete data in the garbage collected region. As noted above, the garbage collection process adds to a maintenance overhead for SMR by consuming time and processing resources to read and rewrite the valid data from garbage collected region.

A data refresh process may also be performed in a region 210 to rewrite data to ensure its integrity against magnetic fields that may inadvertently cause the erasure of some data over time. For example, a last or first track in the region may be susceptible to some erasure due to recent writing in an adjacent region, and after a certain number of adjacent writes, the entire region may need to be rewritten to refresh the data for some of the tracks. As with the garbage collection process discussed above, the reading and rewriting of the data in the region for refreshing the data adds to the maintenance overhead of SMR by consuming time and processing resources to read and rewrite the data in the whole region.

As discussed in more detail below, the present disclosure provides for sub-regions within a region with their own sub-region guard bands to reduce the overhead caused by reading and rewriting data in the region. The sub-regions can reduce the amount of data that needs to be read and rewritten since only the sub-region may need to be read and rewritten, as opposed to the entire region as with conventional SMR. Notably, the addition of the sub-region guard bands do not need to consume additional space on the disk by taking advantage of times when one or more conditions of the DSD are more favorable to using more track overlap or smaller track pitches within the sub-regions to make room for one or more sub-region guard bands within the region.

In the example of FIG. 1, write pointers 20 in memory 140 of DSD 106 can keep track of a current write location for shingle writing data in each region since writing for SMR is typically performed sequentially so as not to overwrite any previously written data due to the overlap of earlier written tracks. As discussed in more detail below, the write pointer for a region can be reset to the beginning of a sub-region as opposed to the beginning of the full region to only read and rewrite data in a particular sub-region and/or for sub-regions that follow, thereby avoiding the need to rewrite the entire region.

In some implementations, the management of the write pointers can include address indirection performed by host 101, such as with file system 10 and mapping 12 in FIG. 1, to ensure that data is sequentially written in the regions using write pointers 14 (i.e., host managed SMR). In other implementations, the management of the write pointers can include address indirection performed by circuitry 120 of DSD 106 to ensure that data is written sequentially in the regions (i.e., drive managed SMR).

In the example of FIG. 1, host 101 includes interface 104, one or more processors 102, and memory 108. Processor(s) 102 can include, for example, circuitry such as one or more Central Processing Units (CPUs), Graphics Processing Units (GPUs), microcontrollers, DSPs, ASICs, FPGAs, hardwired logic, analog circuitry and/or a combination thereof. In some implementations, processor(s) 102 can include an SoC that may be combined with one or more memories, such as memory 108 of host 101, and/or with interface 104. In the example of FIG. 1, processor(s) 102 execute instructions, such as instructions from file system 10 or an operating system of host 101.

Host 101 can communicate with DSD 106 using interface 104 and may use, for example, SATA, PCIe, CXL, SCSI, SAS, Ethernet, or WiFi, and/or one or more other standards. In this regard, interface 104 can include a network interface card in some implementations. In some examples, host 101 can include software for controlling communication with DSD 106, such as a device driver of an operating system of host 101.

As shown in the example of FIG. 1, host 101 includes its own local memory 108, which can include, for example, DRAM, SRAM, MRAM or other type of Storage Class Memory (SCM), or other type of solid-state memory. Memory 108 in the example of FIG. 1 stores file system 10, mapping 12, and write pointers 14. File system 10 can include, for example, an SMR specific file system for managing SMR media in DSD 106. In such implementations, the regions 210 on disk 200 can correspond to logical zones used by file system 10. The sub-regions may then correspond to sub-zones used by file system 10.

In some implementations, file system 10 can perform write pointer management as described below. In other implementations, file system 10 can be configured as a part of a device driver, or as a stand-alone application program. Those of ordinary skill in the art will appreciate that the present disclosure is not limited to these implementations and that the disclosed processes for managing write pointers may be implemented in other environments.

Host 101 can use mapping 12 for associating LBAs with PBAs used by DSD 106, such as for address indirection to ensure data is sequentially written in SMR regions. In some implementations, write pointers 14 can identify a location within each region 210 or each corresponding logical zone where new writes or rewrites to the region or zone are to take place. In yet other implementations, each sub-region or sub-zone may have its own write pointer to indicate a location for new writes or rewrites in the sub-region or sub-zone. The write pointers are typically sequentially advanced through the region or sub-region to ensure the sequential writing of data in SMR regions and sub-regions.

In the case of garbage collection operations discussed above, the use of sub-regions or sub-zones in the present disclosure can facilitate identifying particular sub-regions storing more invalid data than other sub-regions in a region, thereby focusing the reading and rewriting of data on the sub-region or sub-regions of the region that have the most invalid data without having to read and rewrite data from other sub-regions in the region that may have less invalid data or even no invalid data. In some implementations, processor(s) 102 of host 101 executing file system 10 may identify or rank particular sub-regions for garbage collection based on the amount of invalid data stored in the sub-region. In other implementations, circuitry 120 of DSD 106 executing firmware 16 may identify or rank particular sub-regions for garbage collection based on the amount of invalid data stored in the sub-region. In such cases, processor(s) 102 or circuitry 120 may compare an amount of invalid or obsolete data stored in the sub-regions to a threshold level of invalid data (e.g., 20% of the total data stored in the sub-region) and schedule garbage collection for sub-regions that exceed the threshold level of invalid data.

In the case of data refresh operations discussed above, the use of sub-regions or sub-zones in the present disclosure can facilitate identifying particular sub-regions that may include tracks with a higher Write Frequency Count (WFC) that have been incremented based on writes to nearby tracks within an Adjacent Track Interference (ATI) or Wide Area Track Erasure (WATER) range, thereby focusing the reading and rewriting of data on the sub-region or sub-regions of the region that have tracks with the highest WFCs without having to read and rewrite data from other sub-regions in the region that may have lower WFCs and may not need refreshing. In some implementations, processor(s) 102 of host 101 executing file system 10 may identify or rank particular sub-regions for data refresh based on a highest WFC for the sub-region. In other implementations, circuitry 120 of DSD 106 executing firmware 16 may identify or rank particular sub-regions for data refresh based on the highest WFC for the sub-region. In such cases, processor(s) 102 or circuitry 120 may compare the highest WFCs of the sub-regions to a threshold WFC (e.g., 10 nearby writes) and schedule data refresh for sub-regions that exceed the threshold WFC.

Those of ordinary skill in the art will appreciate with reference to the present disclosure that other implementations may include a different number or arrangement of components than those shown in FIG. 1. For example, other implementations may include multiple hosts communicating with DSD 106 or pools of disks or disk packs for storing data. As another example variation, mapping 12 and write pointers 14 can be combined into a single data structure or mapping 18 and write pointers 20 can be combined into a single data structure. In some implementations, only host 101 or DSD 106 may store or manage a mapping and write pointers. In such implementations, it may not be necessary for copies of mapping and write pointers to be stored at both host 101 and DSD 106 as shown in FIG. 1.

FIG. 2 is an example of two regions on disk 200 with one region including sub-regions according to one or more embodiments. As shown in the example of FIG. 2, region 210$_1$ has a consistent track pitch throughout, TP1, while region 210$_2$ includes sub-regions 214$_1$ and 214$_2$, which have different track pitches, TP2 and TP3, respectively. The track pitches are defined by a distance between the centers of the non-overlapped portions of adjacent tracks.

In some implementations, a first track may be written in a region or sub-region and then a setting for the track pitch in the region or sub-region may be determined based on at least one of an indication of a vibration of the DSD, an indication of a temperature of the DSD, and an indication of track misregistration that indicates a radial offset of one or more tracks. The vibration of the DSD can be measured by, for example, vibration sensors at the head, the actuator, and/or as part of the circuitry of the DSD (i.e., circuitry 120 in FIG. 1). The temperature of the DSD can be measured by, for example, temperature sensors at the head, the actuator, a solid-state memory, and/or as part of the circuitry of the DSD (e.g., junction temperature sensors in circuitry 120 in FIG. 1).

Vibration, temperature, and/or track misregistration can generally affect the amount of track overlap or pitch for the tracks that can be used within a margin of safety for accurately locating the tracks on the disk. For example, a fan for cooling the DSD may turn on and temporarily cause vibration in the DSD that may prevent the tracks from being more narrowly written with more track overlap while the fan is on. As another example, a high temperature in the DSD may affect the head's ability to write data in more narrow tracks with more track overlap. Track misregistration where the head is radially offset from its intended location can prevent the tracks from being written more narrowly with more track overlap.

Track misregistration can refer to an accuracy in positioning the head with respect to an intended center for the track when reading or writing data in the track. In some cases, servo wedges on the disk (e.g., servo wedges 220 in FIG. 1) are used to determine deviation of the head from a track center. The indication of track misregistration may represent one or more of different types of track misregistration. One type of track misregistration can include a write-to-read track misregistration of a distance between a center of the non-overlapping portion of a track after it is written and a center of a read element of the head when reading the data from the non-overlapping portion of the track. Another type of track misregistration can include a write track misregistration of a distance between the intended center of the full width track and the center of a write element of the head when the track is actually written. Another type of track misregistration can include a read track misregistration of a distance between an intended track center and a center of the read element of the head when reading data from the track. In addition, the indication of track misregistration can represent one or more of the foregoing types of track misregistration as a repeatable run out track misregistration where the radial offset occurs at the same circumferential position along the track during each revolution of the disk or as a non-repeatable run out track misregistration where the radial offset occurs at different circumferential positions along the track during different revolutions of the disk.

The indications of vibration, temperature, and/or track misregistration may be used to determine a setting for how closely the tracks may be written (i.e., the track pitch or the amount of track overlap). In some implementations, a region or sub-region may first be written with a default track pitch or default amount of track overlap that may represent a generally safe track pitch or amount of track overlap for most conditions until reaching a first predetermined data size for a sub-region. The DSD may then determine whether there is enough space remaining in the region to add a guard band and still be able to write the remaining portion of the region with a largest track pitch setting or lowest amount of track overlap as a precaution against conditions becoming worse for shingle writing with overlapping tracks.

As noted above, each region can have a set data size, such as 128 MiB or 256 MiB. In some implementations, the disk may be formatted by the manufacturer as part of a factory process or during an initial setup in the field where guard bands between the regions are written before writing any data tracks in the regions. The guard bands can be designated to not store data, such as with a mapping for the DSD that may map out the guard bands. In some implementations, one or more disk surfaces of the DSD may also include regions on non-overlapping or Conventional Magnetic Recording (CMR) tracks that may be used for storing metadata or other types of data that are expected to be frequently rewritten. In addition, some implementations may assign regions as being either SMR or CMR based on user settings or other host criteria.

Whether a sub-region guard band can be added to a region during operation to create a sub-region depends on the track pitch or amount of track overlap used so far in the region. As noted above, it is determined in some implementations whether a remaining space on the disk that is allocated to the region can accommodate a guard band and still fit a widest track pitch used by the DSD for shingle writing. The widest track pitch for shingle writing or the least amount of track overlap is used to protect against situations where there may be greater than normal vibration, higher temperatures, and/or greater than average track misregistration, which may require a larger track pitch or less overlap of the tracks for data to be readable from the non-overlapped portions of the tracks. In some implementations, a setting for the track pitch or for an amount of overlap may be determined for any new sub-regions before shingle writing in the sub-region. Additional sub-regions may be added dynamically or on-the-fly as writing progresses throughout the region by evaluating the remaining space available for additional guard bands. Such dynamic adjustment of the track pitch throughout the regions can enable smaller track pitches when conditions are favorable (e.g., lower vibration, lower temperature, and/or less track misregistration) to accommodate sub-region guard bands for additional sub-regions in the region.

As shown in the example of FIG. 2, region $210_1$ begins after guard band $212_1$ and data in the region is written with one track pitch, TP1, without any sub-regions or corresponding sub-region guard bands. This may be due to conditions such as vibration, temperature, and/or track misregistration not allowing for a smaller track pitch. In other cases, region $210_1$ may be designated to have a particular track pitch or default track pitch with no sub-regions, such as if the region is designated for storing a particular type of data that may not benefit as much from having sub-regions, such as data that is infrequently modified. In other cases, region $210_1$ may have been written with a default track pitch that is used for measuring track misregistration for a subsequently written region, such as region $210_2$.

Guard band $212_2$ separates region $210_1$ from region $210_2$ and writing in region $210_2$ begins with narrower tracks (i.e., the non-overlapped portions of the overlapping tracks) having a smaller track pitch TP2 than used in region $210_1$ with greater track overlap. The conditions following or during the completion of writing the first region $210_1$ may have changed so that the smaller track pitch or greater amount of track overlap can be used when beginning to write region $210_2$. In some cases, the writing of region $210_2$ may immediately follow the writing of region $210_1$, but in other cases, there may be time between writing one region and the adjacent region, during which time, data may or may not be read or written at other locations on the disk or on another disk.

After shingle writing a predetermined amount of data in region $210_2$ (e.g., 32 MiB) or when nearing the end of a certain number of tracks in region $210_2$, it is determined that a remaining space allocated for region $210_2$ can fit a guard band for a sub-region and still include wider tracks in the event of unfavorable conditions for narrower tracks. Guard band $212_3$ is then written and a final track for sub-region $214_1$ is written partially overlapping guard band $212_3$. A new setting for a track pitch or amount of track overlap is then determined for writing tracks in the next sub-region $214_2$.

However, conditions for shingle writing in sub-region $214_2$ have worsened from those when writing began for sub-region $214_1$, leading to a larger track pitch TP3 being used for tracks in sub-region $214_2$. The total data size for region $210_2$ (e.g., 128 MiB or 256 MiB) is reached in writing sub-region $214_2$ with the last data track reaching guard band $212_4$ for the region, which may have been previously written as part of a disk formatting process.

Those of ordinary skill in the art will appreciate with reference to the present disclosure that other implementations of regions and sub-regions of overlapping tracks may differ from those shown in the example of FIG. 2. For example, other implementations may attempt to rewrite a region or portion thereof multiple times with a smaller track pitch to prioritize storage capacity over performance, such that region $210_1$ may instead include sub-regions after multiple attempts at writing with a smaller track pitch. As another example variation, more sub-regions may be included in a region, rather than just the two sub-regions shown in FIG. 2 with sub-regions $214_1$ and $214_2$. Such sub-regions may have the same track pitch and/or the same data storage capacity or may have different track pitches and/or different data storage capacities.

Figure 3A:
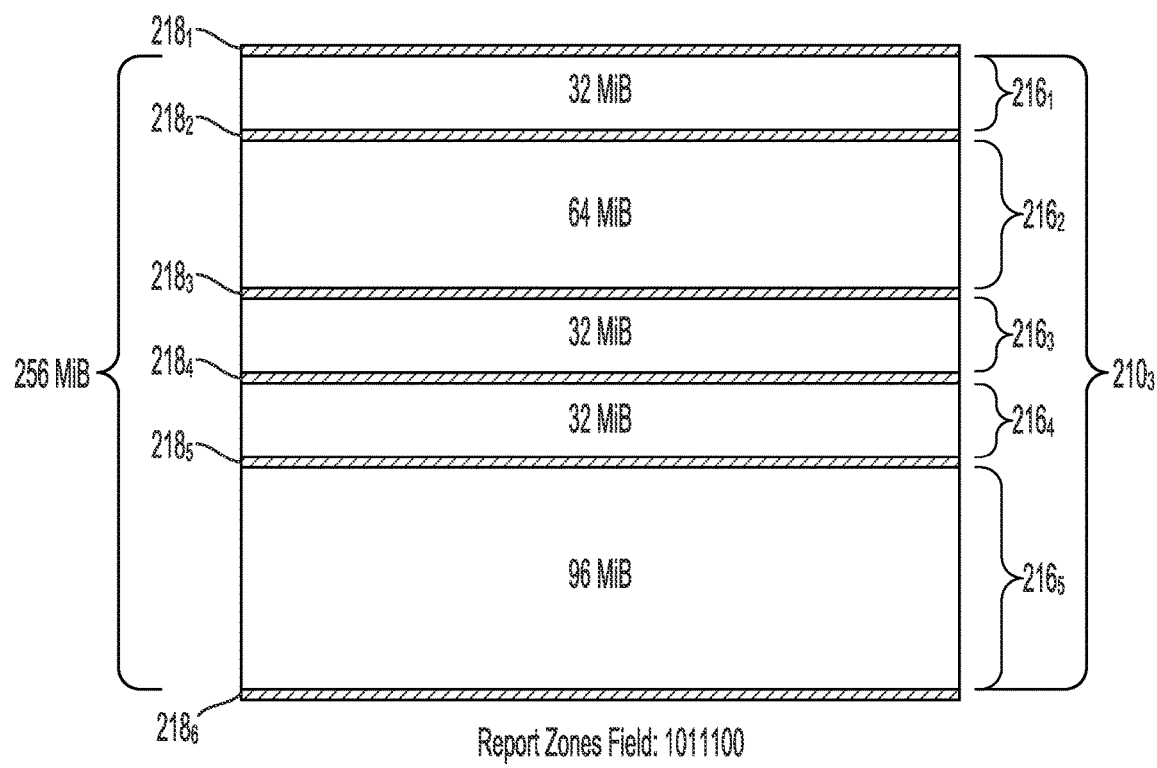
FIG. 3A is an example of sub-regions with different data sizes within a region according to one or more embodiments.

FIG. 3A is an example of sub-regions with different data sizes within region $210_3$ according to one or more embodiments. As shown in FIG. 3A, region $210_3$ has a total data storage capacity of 256 MiB and includes five sub-regions or sub-zones $216_1$, $216_2$, $216_3$, $216_4$, and $216_5$ that are each separated from an adjacent sub-region by respective sub-region guard bands $218_2$, $218_3$, $218_4$, and $218_5$. Region guard bands $218_1$ and $218_6$ separate region $210_3$ from adjacent regions not shown.

Figure 3B:
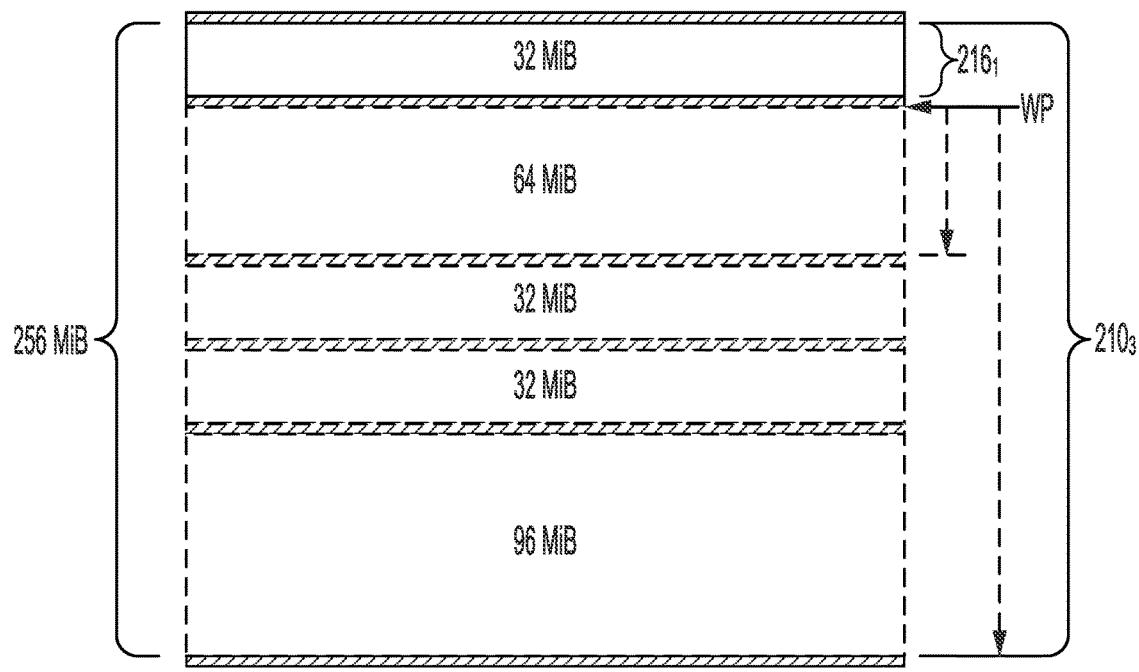
FIG. 3B is an example of resetting a write pointer in the region of FIG. 3A according to one or more embodiments.
Figure 3C:
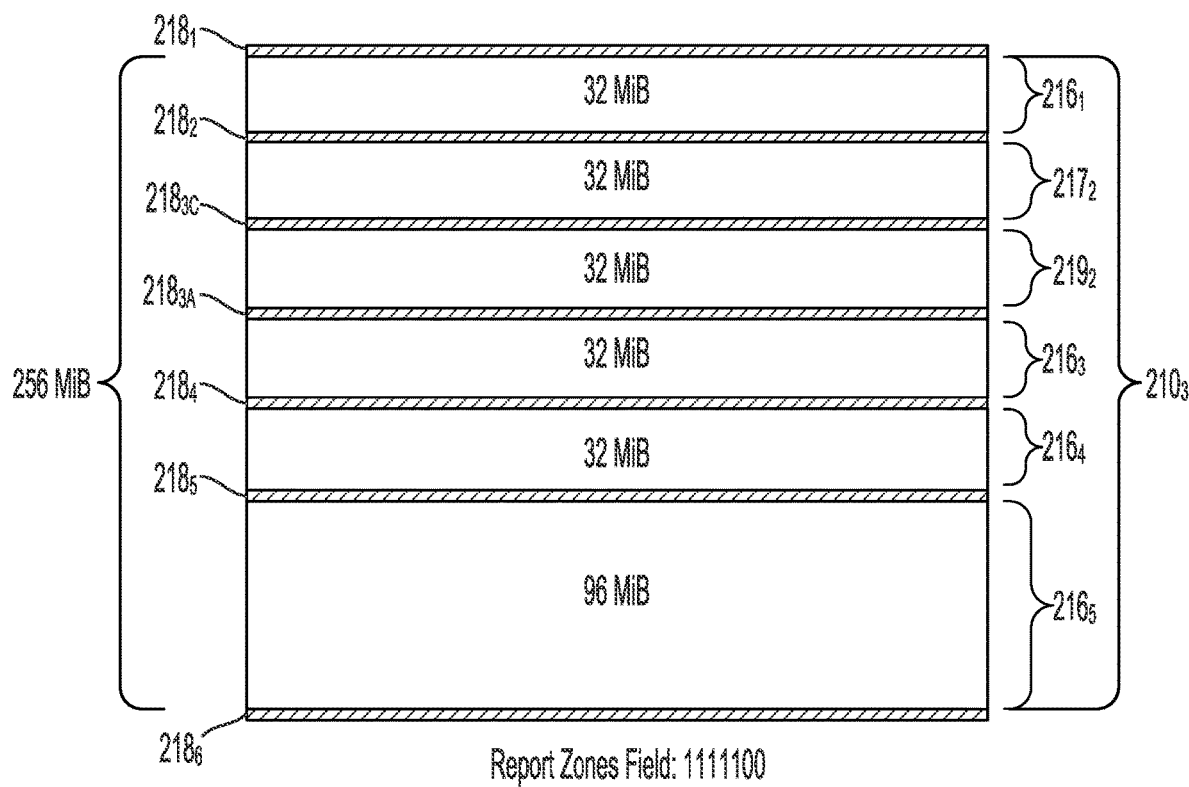
FIG. 3C is an example of the region of FIG. 3B after being at least partially rewritten with an additional sub-region according to one or more embodiments.

In the example of FIG. 3A, sub-regions $216_1$, $216_3$, and $216_4$ have a data size of 32 MiB. These sub-regions may be shingle written in some implementations using a smallest available track pitch or a largest available amount of track overlap that is associated with favorable conditions for SMR in terms of vibration, temperature, and/or lower levels of track misregistration. The relative sizes of the sub-regions shown in FIGS. 3A to 3C represent the amount of data that can be stored in the sub-regions but may not represent the amount of physical space consumed on the disk surface due to differing amounts of track overlap or track pitch used in the sub-regions. In some implementations, the sub-regions with the smaller data sizes (e.g., 32 MiB sub-regions $216_1$, $216_3$, and $216_4$ in FIG. 3A) can be written with smaller track pitches or more track overlap to fit more sub-regions into the region when conditions are favorable for SMR. Larger sub-regions (e.g., 64 MiB sub-region $216_2$ and 96 MiB sub-region $216_5$ in FIG. 3A) may have a relatively larger track pitch or less track overlap due to less favorable conditions for SMR.

As discussed above, the addition of sub-region guard bands can occur while the region is being written based on current conditions that may facilitate shingle writing with more track overlap to make room for the sub-region guard bands. When writing the region is completed or after it is determined that no more sub-regions can be added to the region, the DSD can report the arrangement of sub-regions within the region to the host (e.g., host 101 in FIG. 1) using a report zones field. In the example shown in FIG. 3A, the DSD communicates the arrangement of sub-regions or sub-zones in region $210_3$ using an n−1 numerical composition where n represents a maximum number of sub-zones or sub-regions that can be included in a zone or region.

In the example of FIG. 3A, region $210_3$ is capable of including up to eight 32 MiB sub-regions if conditions permit the greatest amount of track overlap or the smallest track pitch. The region may then include one or more sub-regions of different multiples of this minimum sub-region data size, such as 64 MiB and 96 MiB as in FIG. 3A. In this regard, some implementations may use a predetermined number of options for sub-region data sizes and corresponding quantities of sub-regions that can fit into a fixed sized region (e.g., 128 MiB or 256 MiB). The report zones field for the arrangement of sub-regions in FIG. 3A includes seven binary numbers to indicate whether a sub-region boundary or sub-region guard band occurs after each increment of 32 MiB within the region. A value of "1" indicates the end of the sub-region and a value of "0" indicates that no sub-region guard band was added following the 32 MiB interval.

The host can use this information to update its mapping (e.g., mapping 12 in FIG. 1) and to control the resetting of write pointers (e.g., write pointers 14 in FIG. 1) in cases where the DSD is a host managed SMR drive. As noted above, the host or the DSD may reset a write pointer for one or more sub-regions to be rewritten, such as to reclaim space that is being consumed by invalid or obsolete data or to refresh data to maintain its integrity.

Those of ordinary skill in the art will appreciate with reference to the present disclosure that other implementations may use a different number of sub-regions and/or data sizes for the sub-regions than shown in FIG. 3A. For example, other implementations may instead use up to sixteen 16 MiB regions or multiples thereof to complete a 256 MiB region or may use up to four 64 MiB regions or multiples thereof to complete a 256 MiB region. In addition, and as noted above, other implementations may instead use regions with a different overall data size, such as 128 MiB, which can affect the number and/or sizes of possible sub-regions that can fit into the region.

FIG. 3B is an example of resetting a write pointer in the region of FIG. 3A according to one or more embodiments. As shown in FIG. 3B, the write pointer for region $210_3$ is reset from an end of the region to the beginning of the second region. In some cases, only the data in the second sub-region may be rewritten as shown by the first dashed arrow pointing down to the third sub-region. In other cases, the data may be rewritten up to the end of any of the subsequent sub-regions (i.e., up to the end of sub-region $216_3$ or $216_4$ in FIG. 3A) or to the end of the region (i.e., up to the end of sub-region $216_5$ in FIG. 3A), as indicated by the second dashed arrow pointing down to the end of the region.

The addition of sub-regions with their respective guard bands within the region can allow for a more selective rewrite process (e.g., garbage collection or data refresh) that lowers the overhead associated with SMR by reducing the amount of data being read and rewritten from the region. In the example of FIG. 3B, all of the data in the first sub-region $216_1$ or more than a threshold amount of data may be valid and may not require being garbage collected. Resetting the write pointer to the beginning of the second sub-region following sub-region $216_1$ (i.e., sub-region $216_2$ in FIG. 3A), enables the reading and rewriting to skip sub-region $216_1$. In cases where only the second zone is rewritten, the subsequent sub-regions may also be skipped (i.e., sub-regions $216_3$, $216_4$, and $216_5$ in FIG. 3A). This can significantly lower the consumption of processing resources and the time taken to garbage collect or refresh the data stored for a region. Those of ordinary skill in the art will appreciate with reference to the present disclosure that other examples can involve resetting the write pointer to the beginning of a different sub-region, such as the third, fourth, or fifth sub-regions in FIG. 3B (i.e., sub-regions $2613$, $216_4$, or $216_5$ in FIG. 3A).

FIG. 3C is an example of the region of FIG. 3B after being at least partially rewritten with an additional sub-region according to one or more embodiments. As shown in the example of FIG. 3C, the rewriting of the second sub-region identified as sub-region $216_2$ in FIG. 3A after resetting the write pointer to the beginning of the second sub-region results in an additional sub-region, with two 32 MiB sub-regions $217_2$ and $219_2$ replacing the previously written 64 MiB sub-region $216_2$ in FIG. 3A. In some implementations, the DSD may determine a setting for the track pitch or amount of track overlap for rewriting the sub-region. The conditions for increasing the amount of track overlap or for using a smaller track pitch may have improved since the sub-region was originally written as a single 64 MiB sub-region. This frees up space for adding sub-region guard band $218_{3C}$ and sub-region guard band $218_{3A}$ remains in the same location as $218_3$ in FIG. 3A.

After completing the writing of sub-region $217_2$ or $219_2$, the host may be updated with a new report zones field for the region. As shown at the bottom of FIG. 3C, the report zones field has changed from "1011100" in FIG. 3A to "1111100" in FIG. 3C to reflect the change of the original 64 MiB second sub-region represented by the second and third digits of "01" in the original report zones field to the two 32 MiB sub-regions represented by the second and third digits of "11" in the new report zones field.

Those of ordinary skill in the art will appreciate with reference to the present disclosure that other options are possible for rewriting a portion of region $210_3$. For example, the sub-region may be rewritten with the same data size of 64 MiB or the remainder of region $210_3$ may have a different arrangement of sub-regions and sub-region data sizes, which can depend on the conditions for writing overlapping tracks during the rewrite process (e.g., vibration, temperature, and/or track misregistration).

Example Processes

Figure 4:
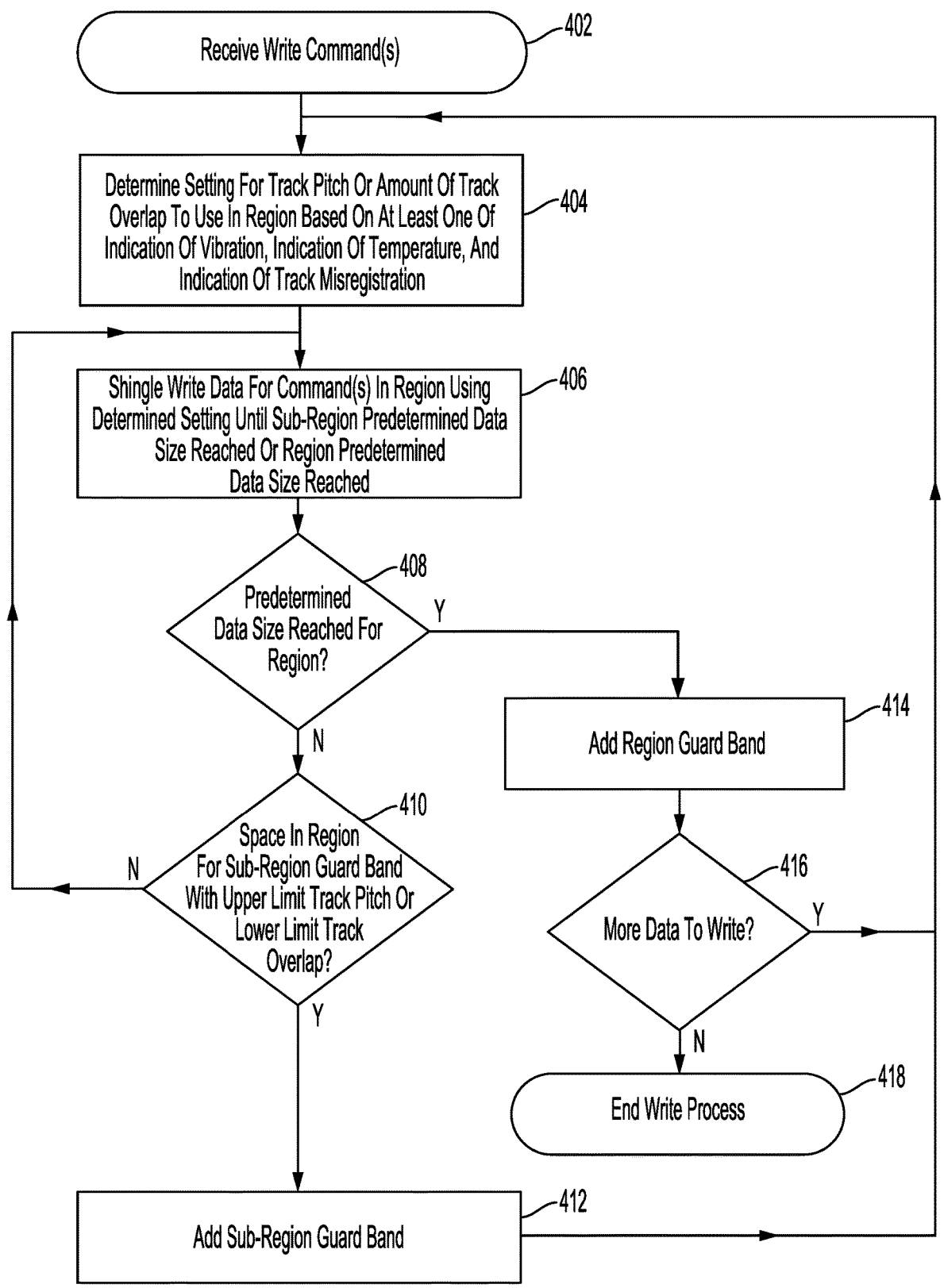
FIG. 4 is a flowchart for a write process according to one or more embodiments.

FIG. 4 is a flowchart for a write process according to one or more embodiments. The process of FIG. 4 can be performed by, for example, circuitry 120 of DSD 106 executing firmware 16 in FIG. 1. In this regard, circuitry 120 can, in some implementations, comprise a means for performing the functions of the write process of FIG. 4.

In block 402, one or more write commands are received, such as from a host, to write data on a disk of the DSD. In some implementations, the host may specify a region for writing the data, such as host 101 in FIG. 1 using mapping 12. In other implementations, the circuitry of the DSD can identify the region on the disk where the data will be written and update its mapping and write pointer accordingly (e.g., mapping 18 and write pointers 20 in FIG. 1).

In block 404, the circuitry determines a setting for a track pitch or amount of track overlap for shingle writing the data in a region. The setting is determined based on at least one of an indication of vibration, an indication of temperature, and an indication of track misregistration. In some implementations, a previously written track from a different region may be used to determine a current indication of track misregistration. In other implementations, the determination of the setting in block 404 may include writing one or more initial tracks in the region to assess the current track misregistration.

In block 406, the data for the one or more write commands are shingle written in the region using the determined setting for the track pitch or amount of track overlap. The data is shingle written in the region until reaching a predetermined data size for a sub-region or until reaching a predetermined data size for the region. In some implementations, the predetermined data size for a sub-region can correspond to a smallest sub-region size such as the 32 MiB data size used in the examples of FIGS. 3A to 3C above. The circuitry may use, in some examples, the write pointer position for the region to determine how much data has been written in the region.

In block 408, it is determined whether the predetermined total data size has been reached for the region. As discussed above, the total data size for regions on the disk may be set as, for example, 128 MiB or 256 MiB. In some implementations, this may involve the circuitry checking the position of the write pointer for the region with respect to an end for the region indicated by or in a mapping maintained by the DSD (e.g., mapping 18 in FIG. 1). In other implementations, the end of the region can be determined based on reading an end of region indicator from the disk, such as from a particular sector in a track on the disk at the end of the region. If it is determined in block 408 that the predetermined data size for the region has been reached, the process proceeds to block 414 to add a guard band for the region (e.g., guard band $218_6$ in FIG. 3A).

In block 416, it is determined whether there is more data to be written for the one or more commands. If so, the shingle writing can continue in a next region by returning the process to block 404 to determine a setting for track pitch or amount track overlap in the new region. On the other hand, if there is not more data to write in block 416, the write process of FIG. 4 ends in block 418.

If it is determined in block 408 that the predetermined data size for the region has not been reached, the circuitry determines in block 410 whether there is space for adding a sub-region guard band in the region and still reach the predetermined data size for the region if using an upper limit track pitch (i.e., a largest track pitch available to the DSD for SMR) or a lower limit amount of track overlap (i.e., a smallest amount of track overlap available to the DSD for SMR). The circuitry may, in some implementations, use a locally stored mapping and a current position of a write pointer for the region to determine a remaining number of physical blocks, sectors, or tracks at a particular track overlap or track pitch setting remaining in the region and a corresponding data size.

In some implementations, the size of a sub-region guard band track (e.g., one blank or empty track or a fraction thereof) may then be subtracted from the remaining portion available for writing data in the region. The difference may then be used to calculate a number of widest tracks (i.e., with an upper limit of track pitch or lower limit of track overlap) that would fit into the remaining portion of the region excluding the sub-region guard band. The circuitry may then calculate the amount of data that could be stored in this number of tracks and determine if the sum of the data already written in the region and the amount that could be shingle written in the region with the sub-region guard band and widest SMR tracks (i.e., the non-overlapping portion of the tracks) is greater than or equal to the predetermined data size for the region.

Those of ordinary skill in the art with appreciate with reference to the present disclosure that other ways of determining if the sub-region guard band will fit into a remaining portion of the region with tracks using the upper limit track pitch or lower limit track overlap are possible. The foregoing calculations are merely provided as one example among many different ways of determining whether the sub-region guard band will fit into the remaining portion of the region when written with the widest possible SMR tracks.

If it is determined in block 410 that there is not enough space remaining in the region to accommodate a sub-region guard band and a worst-case scenario of a widest track pitch, the write process returns to block 406 to continue shingle writing data for the one or more commands in the region until reaching the predetermined data size for the region.

If it is determined in block 410 that there is enough space remaining in the region to accommodate a sub-region guard band and the largest available SMR track pitch, a sub-region guard band is added in block 412. The write process continues to block 404 to determine a setting for track pitch or amount of track overlap in the new sub-region, which may or may not have the same setting as the previously completed sub-region depending on current conditions, such as a measured vibration, a measured temperature, and/or a measured track misregistration.

Those of ordinary skill in the art will appreciate with reference to the present disclosure that other implementations of the write process of FIG. 4 may differ. For example, in some implementations, the determination of a setting for a track pitch or amount of track overlap may occur more frequently, such as within sub-regions at every other track or halfway through the predetermined data size for a smallest sub-region. As another example variation, a write command may be received to write data for less than the sub-region predetermined data size and the process may pause at block 406 until additional write commands for the region are received to continue shingle writing in the region. In this regard, the write process of FIG. 4 may be performed concurrently for different regions on the same disk surface or on different disk surfaces with the current write position for each region being tracked with a write pointer for the region.

Figure 5:
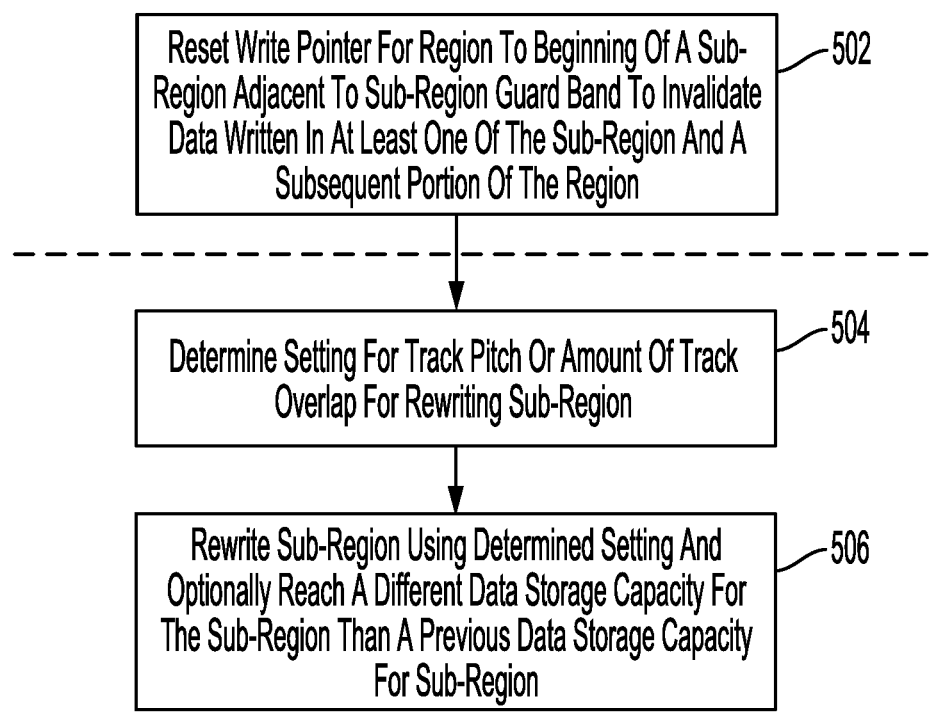
FIG. 5 is a flowchart for a write pointer reset process according to one or more embodiments.

FIG. 5 is a flowchart for a write pointer reset process according to one or more embodiments. The process of FIG. 5 can be performed by, for example, circuitry 120 of DSD 106 executing firmware 16 in FIG. 1 in some implementations. In other implementations, the process of FIG. 5 can be performed by processor(s) 102 of host 101 in FIG. 1 to reset the write pointer in block 502 and by circuitry 120 of DSD 106 to determine a setting for track pitch in block 504 and rewrite a sub-region in block 506. In this regard, circuitry 120 and/or processor(s) 102 can, in some implementations, comprise a means for performing the functions of the write pointer reset process of FIG. 5.

In block 502, a write pointer for a region is reset to the beginning of a sub-region adjacent to a sub-region guard band that is not at the beginning of the region. The resetting of the write pointer may follow or be part of a garbage collection process or a data refresh process to read data in the region and rewrite the data in a different region or in the same region. Resetting the write pointer invalidates data written in at least one of the sub-region and a subsequent portion of the region, which may include additional sub-regions in the region. With reference to the example of FIG. 3B discussed above, the write pointer for the region can be reset to the beginning of the second sub-region to either invalidate just the data in the second sub-region or to invalidate all the data in the region that follows the first sub-region 216₁. The circuitry may use a write pointer data structure and/or a mapping data structure (e.g., write pointers 20 and/or mapping 18 in FIG. 1) to indicate whether resetting the write pointer for the region is limited to invalidating just the data for the sub-region or for invalidating the remaining data for the region, such as with a flag or value used in the mapping for the region.

The data previously stored in the sub-region or in the remainder of the region may have already been read for valid data that can be rewritten in another region or may be rewritten in the same region without any invalid or obsolete data that was stored in the sub-region or in the remainder of the region. A dashed line between blocks 502 and 504 indicates that the rewriting of the sub-region or the remainder of the region may occur in some implementations at a later point if the sub-region or the remainder of the region is not to be immediately rewritten, such as with the immediate rewriting of valid data that has been read from the sub-region or from the remainder of the region prior to resetting the write pointer.

In block 504, a setting is determined for the track pitch or the amount of track overlap for rewriting the sub-region. In some cases, the rewriting of the sub-region in blocks 504 and 506 may form part of the write process of FIG. 4 discussed above such that the one or more commands can be received from a host to write data or may be maintenance commands from the DSD itself to rewrite data in the sub-region or sub-regions.

In block 506, the circuitry rewrites the sub-region using the setting determined in block 504. In some cases, the rewritten sub-region may have a different data storage capacity for the sub-region than a previous data storage capacity for the sub-region. For example, the conditions for shingle writing overlapping tracks may be more favorable than when the sub-region was previously written to enable a smaller data storage capacity for the sub-region to add a new sub-region and sub-region guard band in the previously larger sub-region. Such an example is provided in FIG. 3C discussed above where two 32 MiB sub-regions replace a single 64 MiB region from FIG. 3B.

On the other hand, if the conditions for shingle writing overlapping tracks are not as good as they were when the sub-region was previously written, a larger track pitch or less track overlap may be used for rewriting the sub-region in block 506. In such a case, the sub-region may have a larger data storage capacity since one or more subsequent sub-regions in the region may no longer be included in the rewritten region because there may not be enough room in the region to add sub-region guard bands and guarantee shingle writing at the worst-case widest track pitch within the space allocated for the region. In this regard, the rewriting of only a single sub-region may be limited to cases where the setting for the track pitch is at least as small as the previous setting used to shingle write the sub-region to ensure that subsequent sub-regions will not be affected by rewriting the sub-region. In cases where the same or a smaller track pitch cannot be used for the sub-region, the remainder of the region beyond the sub-region, if any, may need to be rewritten.

In some cases, the setting for the track pitch may be the same as previously used for the sub-region. The sub-region can have the same data storage capacity in such cases. In addition, if the setting determined in block 504 enables a smaller track pitch it still may not be possible to fit an additional sub-region guard band and additional sub-region into the remaining portion of the region. In such cases, the sub-region may still have the same data storage capacity as before and the track pitch may be relaxed to the previous setting used for the sub-region since adding another sub-region guard band and new sub-region would not fit in the region anyway. This may also be the case in situations where the sub-region to be rewritten is the last sub-region for the region.

Those of ordinary skill in the art will appreciate with reference to the present disclosure that other implementations of the write pointer reset process of FIG. 5 may differ. For example, in some implementations each sub-region may have its own write pointer. In such implementations, the write pointers may be reset on a sub-region by sub-region basis.

Figure 6:
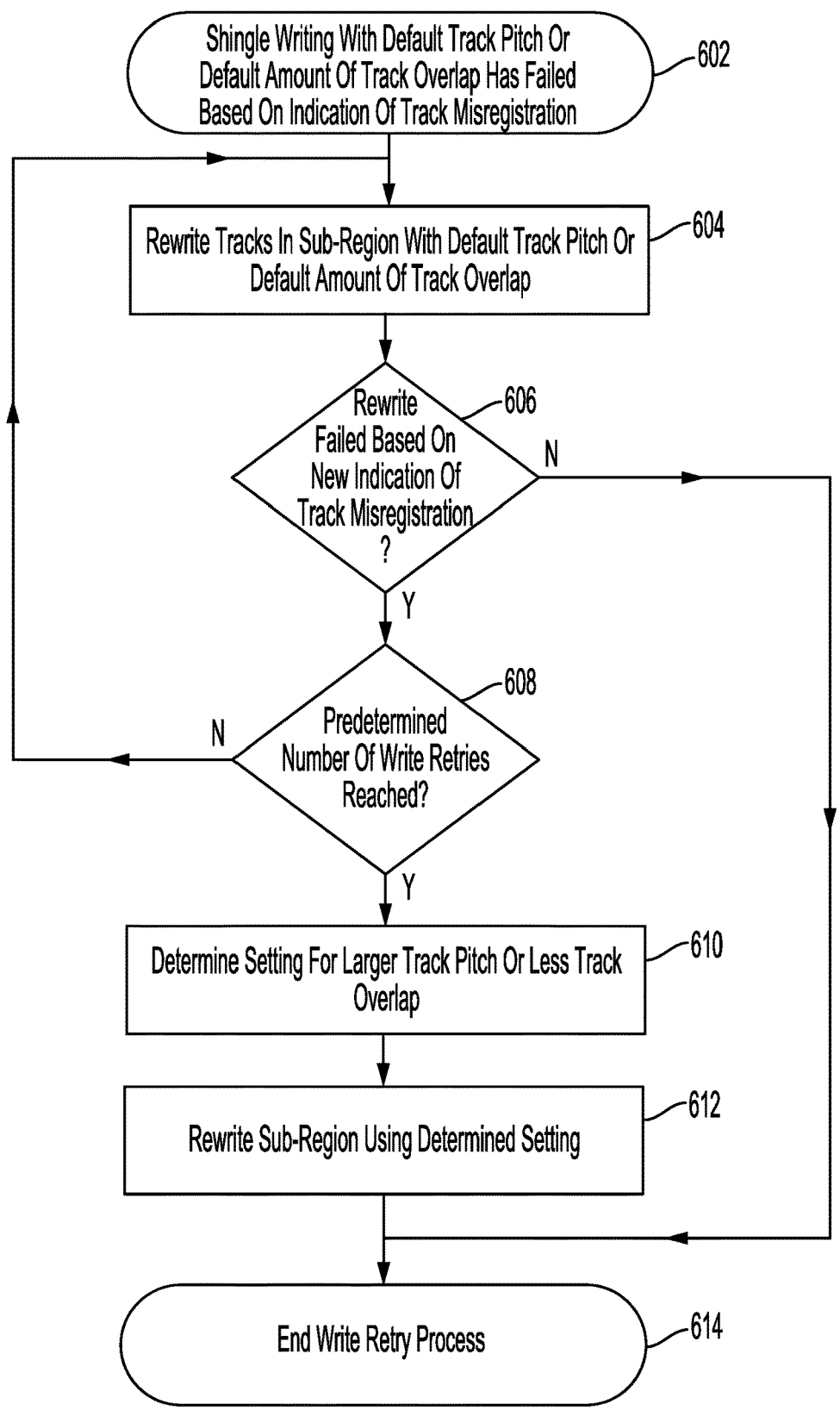
FIG. 6 is a flowchart for a write retry process according to one or more embodiments.

FIG. 6 is a flowchart for a write retry process according to one or more embodiments. The process of FIG. 6 can be performed by, for example, circuitry 120 of DSD 106 executing firmware 16 in FIG. 1. In this regard, circuitry 120 can, in some implementations, comprise a means for performing the functions of the write retry process of FIG. 6.

In block 602, the circuitry determines that shingle writing in a region with a default track pitch or a default amount of track overlap has failed based on an indication of track misregistration. The default track pitch or default amount of track overlap may be set by a user or may be set by the manufacturer of the DSD, for example. In some implementations, different portions of the disk or different disk surfaces in the DSD may have different defaults for track pitch or the amount of track overlap. The default track pitch or default amount of track overlap can be used to prioritize storage capacity or recoverability of the data over performance in terms of how quickly data can be written or read in the region. For example, certain implementations may prioritize data storage capacity by setting a relatively narrow track pitch with a larger amount of track overlap so that data is first attempted to be shingle written in narrow tracks in the region. As discussed in more detail below, a predetermined number of attempted retries to shingle write the data with the narrower default track pitch may be balanced against the possible loss in performance caused by multiple attempts to write the data using the smaller default track pitch if it is not initially successful.

In other implementations, the default track pitch or default amount of track overlap may be set so that a relatively wider track pitch is initially used for shingle writing a region so that it is more likely that the write will be successful. Using a wider default track pitch can also help ensure reliability or recoverability of the data from the tracks since data can typically be read more consistently from wider tracks over a variety of conditions. However, a particular DSD may often be capable of shingle writing more narrow tracks in the field as compared to a design condition or specification for the DSD, since such design conditions or specifications may include a margin of safety for more vibration, higher temperatures, and/or more track misregistration (e.g., such as due to a manufacturing tolerance for the sizing and positioning of a write element and/or a read element of a head) than actually experienced by the particular DSD in practice.

In some implementations, only a first portion or a first few tracks of the region may be shingle written using the default track pitch or default amount of track overlap. The determination as to whether shingle writing one or more tracks using the default track pitch can be made by measuring the track misregistration. Writing with the default track pitch is determined to fail if the track misregistration exceeds a threshold level or deviation. In some implementations, the threshold level or deviation can correspond to a threshold at which writes may be inhibited by the circuitry.

In block 604, another attempt is made to shingle write tracks in the sub-region with the default track pitch or default amount of track overlap and in block 606 it is determined whether the rewrite failed based on a new indication of track misregistration. If the rewrite is determined not to have failed in block 606, the process proceeds to block 614 to end the write retry process. In this case, conditions may have improved for writing the tracks using the default track pitch or default amount of track overlap.

On the other hand, if it is determined in block 606 that the rewrite failed, it is determined in block 608 whether a predetermined number of write retries has been reached in block 608. The circuitry may keep track of how many write retries are made to shingle write in the sub-region with the default track pitch and compare the number of write retries to the predetermined number of write retries. If the predetermined number of write retries has not been reached in block 608, the write retry process returns to block 604 to attempt to rewrite the tracks again in the sub-region using the default track pitch.

If the predetermined number of write retries has been reached in block 608, the circuitry in block 610 determines a setting for a larger track pitch or for less track overlap. The determination of the setting may be based on, for example, a measured amount of vibration at a component of the DSD such as the head, a measured temperature of the DSD, and/or a measured amount of track misregistration. In some implementations, the last measurement of track misregistration used to determine that writing with the default track pitch failed may be used to determine the setting in block 610. For example, the setting for the track pitch may be scaled based on the magnitude of track misregistration.

In block 612, the sub-region is rewritten using the setting determined in block 610. If rewriting with the larger track pitch also fails, the write retry process in some implementations can start over with block 602 and use the setting for the larger track pitch or less track overlap as a new default setting for the sub-region. After rewriting the sub-region in block 612, the write retry process ends in block 614.

Those of ordinary skill in the art will appreciate with reference to the present disclosure that other implementations of the write retry process of FIG. 6 may differ. For example, instead of attempting to rewrite the tracks in block 604 using the same default track pitch, other implementations may instead use a next larger setting for track pitch in block 604. As another example variation, block 608 may be omitted in some implementations where there is not a predetermined number of write retries to be performed using the same setting for track pitch or amount of track overlap. As yet another example variation, the rewriting using the default track pitch may continue by repeating blocks 604 and 606 until tracks are successfully written using the default track pitch or there may be a pause in writing to the sub-region after a certain number of write retries with the default track pitch.

The foregoing use of adjustable sub-regions can improve the overall performance of DSDs by reducing the amount of data that needs to be rewritten for operations such as garbage collection or data refreshing in a region since the sub-regions can be separated by sub-region guard bands to enable smaller localized rewrites in the region. In addition, the present disclosure can better take advantage of situations where a narrower track pitch can be realized based on the actual conditions of a particular DSD while writing the region.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes processor or controller circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, processor circuitry, and controller circuitry described in connection with the examples disclosed herein may be implemented or performed with a general purpose processor, a GPU, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. Processor or controller circuitry may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by processor or controller circuitry, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to processor or controller circuitry such that the processor or controller circuitry can read information from, and write information to, the storage medium. In the alternative, the storage medium may be integral to processor or controller circuitry. The processor or controller circuitry and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A Data Storage Device (DSD), comprising:
a disk configured to store data;
a head configured to write data on the disk in tracks; and
circuitry configured to:
shingle write data in a region on the disk using the head such that adjacent tracks partially overlap each other to define a track pitch between centers of non-overlapped portions of the adjacent tracks;
determine whether shingle writing data in a remaining available portion of the region with an upper limit track pitch would leave enough space for a first sub-region guard band in the region and still reach a predetermined data storage capacity for the region, wherein the first sub-region guard band is designated to not store data and separates a first sub-region including shingle written tracks with a first track pitch from a second sub-region to be shingle written; and
in response to determining that shingle writing data in the remaining available portion with the upper limit track pitch would leave enough space for the first sub-region guard band in the region and still reach the predetermined data storage capacity for the region:
add the first sub-region guard band in the region; and
shingle write in the second sub-region with less than or equal to the upper limit track pitch using the head.

2. The DSD of claim 1, wherein the circuitry is further configured to determine a setting for a second track pitch for shingle writing data in the second sub-region based on at least one of an indication of a vibration of the DSD, an indication of a temperature of the DSD, and an indication of track misregistration indicating radial offset of one or more tracks written on the disk.

3. The DSD of claim 1, wherein the circuitry is further configured to shingle write a plurality of sub-regions in the region using the head with each sub-region of the plurality of sub-regions being separated from another sub-region by a sub-region guard band, and wherein the region is separated from a next region on the disk by a region guard band designated to not store data.

4. The DSD of claim 1, wherein the first sub-region has a different data storage capacity than the second sub-region.

5. The DSD of claim 1, wherein the circuitry is further configured to:
reset a write pointer for the region to the beginning of a sub-region in the region that is adjacent to a sub-region guard band to invalidate data written in at least one of the sub-region and a subsequent portion of the region, wherein the beginning of the sub-region is not located at a beginning of the region.

6. The DSD of claim 1, wherein the circuitry is further configured to:
rewrite the first sub-region using a different track pitch than the first track pitch using the head to reach a different data storage capacity for the first sub-region than a previous data storage capacity for the first sub-region after being written using the first track pitch.

7. The DSD of claim 1, wherein the circuitry is further configured to:
use a first default track pitch for shingle writing using the head in a first region on the disk; and use a second default track pitch for shingle writing using the head in a second region on the disk, wherein the first default track pitch is different from the second default track pitch.

8. The DSD of claim 1, wherein the circuitry is further configured to:
determine that shingle writing tracks with a default track pitch has failed based on an indication of track misregistration indicating radial offset of one or more tracks written on the disk, wherein the default track pitch is less than the upper limit track pitch; and
in response to determining that shingle writing the tracks with the default track pitch has failed:
rewrite the tracks with the default track pitch using the head; and
determine whether the rewritten tracks with the default track pitch failed based on a new indication of track misregistration indicating radial offset of one or more of the rewritten tracks.

9. The DSD of claim 1, wherein the circuitry is further configured to:
shingle write a plurality of sub-regions in the region using the head; and
report, to a host configured to communicate with the DSD, a physical order of the plurality of sub-regions in the region and a respective data storage capacity of each sub-region of the plurality of sub-regions.

10. A method of operating a Data Storage Device (DSD), the method comprising:
shingle writing data in a first sub-region of a region on a disk such that adjacent tracks partially overlap each other to reach a first predetermined data storage capacity for the first sub-region;
determining whether a predetermined data storage capacity for the region can be reached by adding a first sub-region guard band and shingle writing throughout a remaining available portion of the region using a lower limit of track overlap of adjacent tracks,
wherein the first sub-region guard band is designated to not store data and separates the first sub-region from a second sub-region of partially overlapping tracks in the region; and
in response to determining that the predetermined data storage capacity for the region can be reached by adding the first sub-region guard band and shingle writing with the lower limit of track overlap throughout the remaining available portion of the region:
adding the first sub-region guard band in the region; and
shingle writing in the second sub-region with at least as much track overlap as the lower limit of track overlap.

11. The method of claim 10, further comprising determining a setting for an amount of track overlap for shingle writing data in the second sub-region based on at least one of an indication of a vibration of the DSD, an indication of a temperature of the DSD, and an indication of track misregistration indicating radial offset of one or more tracks written on the disk.

12. The method of claim 10, further comprising shingle writing a plurality of sub-regions in the region with each sub-region of the plurality of sub-regions being separated from another sub-region by a sub-region guard band in the region, and wherein the region is separated from a next region of tracks on the disk by a region guard band designated to not store data.

13. The method of claim 10, wherein the first sub-region has a different data storage capacity than the second sub-region.

14. The method of claim 10, further comprising:
resetting a write pointer for the region to the beginning of a sub-region in the region that is adjacent to a sub-region guard band to invalidate data written in at least one of the sub-region and a subsequent portion of the region, wherein the beginning of the sub-region is not located at a beginning of the region.

15. The method of claim 10, further comprising:
rewriting the first sub-region with a different amount of track overlap than a previous amount of track overlap used in the first sub-region to reach a different data storage capacity for the first sub-region than a previous data storage capacity for the first sub-region after being written with the first amount of track overlap.

16. The method of claim 10, further comprising:
using a first default amount of track overlap for shingle writing in a first region on the disk, the first default amount of track overlap being more than the lower limit of track overlap; and
using a second default amount of track overlap for shingle writing in a second region on the disk, wherein the first default amount of track overlap is different from the second default amount of track overlap.

17. The method of claim 10, further comprising:
determining whether the predetermined data storage capacity for the region can be reached by adding a second sub-region guard band and shingle writing in a smaller remaining available portion of the region with the lower limit of track overlap,
wherein the second sub-region guard band is designated to not store data and separates the second sub-region from a third sub-region of partially overlapping tracks in the region; and
in response to determining that the predetermined data storage capacity for the region can be reached by adding the second sub-region guard band and shingle writing with the lower limit of track overlap in the smaller remaining available portion of the region:
adding the second sub-region guard band; and
shingle writing in the third sub-region with at least as much track overlap as the lower limit of track overlap.

18. The method of claim 10, further comprising:
shingle writing a plurality of sub-regions in the region; and
reporting, to a host configured to communicate with the DSD, a physical order of the plurality of sub-regions in the region and a respective data storage capacity of each sub-region of the plurality of sub-regions.

19. A Data Storage Device (DSD), comprising:
a disk configured to store data;
a head configured to write data on the disk in tracks; and
means for:
shingle writing data in a region on the disk using the head such that adjacent tracks partially overlap each other to define a track pitch between centers of non-overlapped portions of the adjacent tracks;
determining whether shingle writing data in a remaining available portion of the region with an upper limit track pitch would leave enough space for a first sub-region guard band in the region and still reach a predetermined data storage capacity for the region, wherein the first sub-region guard band is designated to not store data and separates a first sub-region including shingle written tracks with a first track pitch from a second sub-region to be shingle written; and in response to determining that shingle writing data in the remaining available portion with the upper limit track pitch would leave enough space for the first sub-region guard band in the region and still reach the predetermined data storage capacity for the region:

adding the first sub-region guard band in the region; and shingle writing in the second sub-region using the head.

20. The DSD of claim 19, further comprising means for determining a setting for a second track pitch for shingle writing data in the second sub-region based on at least one of an indication of a vibration of the DSD, an indication of a temperature of the DSD, and an indication of track misregistration indicating radial offset of one or more tracks written on the disk.

\* \* \* \* \*